United States Patent [19]

Zeile, Jr.

[11] 4,025,091
[45] May 24, 1977

[54] CONDUIT SYSTEM

[75] Inventor: George David Zeile, Jr., Medina, Ohio

[73] Assignee: Ric-Wil, Incorporated, Brecksville, Ohio

[22] Filed: Apr. 30, 1975

[21] Appl. No.: 573,123

[52] U.S. Cl. .............................. 285/53; 138/149; 285/DIG. 5
[51] Int. Cl.² ......................................... F16L 59/16
[58] Field of Search ......... 285/47, 53, 369, DIG. 5; 138/149

[56] References Cited

UNITED STATES PATENTS

| 3,492,029 | 1/1970 | French et al. | 285/47 |
| 3,563,572 | 2/1971 | French | 285/369 X |
| 3,645,564 | 2/1972 | Corriston | 285/47 |
| 3,854,756 | 12/1974 | Couch | 285/47 |

Primary Examiner—Thomas F. Callaghan
Attorney, Agent, or Firm—Watts, Hoffmann, Fisher & Heinke Co.

[57] ABSTRACT

A conduit system including conduit units which are interconnected by coupling units during field installation. The conduit units include a pipe, a pipe insulating body, a conduit jacket around the insulating body and conduit sealing members at opposite ends of the conduit unit. The coupling units include a coupling body for telescopically receiving ends of adjacent conduit pipes, an insulating body, a coupling jacket around the insulating body, and coupling sealing members at opposite ends of the coupling unit.

When the coupling and conduit units are assembled the sealing member of one unit bridges the juncture of adjacent jacket ends to provide a primary seal against infiltration of moisture. The sealing members of adjacent units sealingly abut each other to provide a secondary seal against moisture infiltration spaced axially from the adjacent ends of the conduit and coupling jackets. The sealing member which forms the primary seal is provided with a fluted outer periphery defining a series of circumferential ribs which are resiliently and sealingly engaged with the associated jackets on opposite sides of the adjacent jacket ends.

In one illustrated embodiment the sealing member forming the primary seal is the conduit sealing member while in another illustrated embodiment the coupling sealing member forms the primary seal.

1 Claim, 2 Drawing Figures

CONDUIT SYSTEM

BACKGROUND OF THE INVENTION

1. Field of the Invention

The present invention relates to conduit systems and more particularly relates to conduit systems in which adjacent ends of conduit units of the systems are sealingly coupled in the field during installation.

2. The Prior Art

The prior art has proposed conduit systems in which individual conduit units of a system carry an integral coupling arrangement for sealingly coupling adjacent ends of two conduit units together. Although such coupling units have enabled thermal expansion and contraction of pipes in the conduit units while maintaining a sealed relationship between the pipes, the construction of conduit units with integral couplings complicated the process by which the conduit units were constructed thus increasing the cost of the conduit units. Furthermore, assembly of these conduit units in the field was sometimes difficult, time-consuming, and at times lead to damages to the seals between them. U.S. Pat. No. 3,492,029 to French, et al., issued Jan. 27, 1970 is illustrative of such systems.

In order to simplify the construction and installation of conduit systems as well as to better accommodate thermal expansion and contraction of the conduit pipes the prior art proposed conduit systems having conduit units interconnected by individual coupling units. The coupling units enabled the conduit units to be more simply constructed and provided space for thermal expansion and contraction of the conduit pipes. U.S. Pat. No. 3,854,756 to Couch, issued Dec. 17, 1974 disclosed such a conduit system construction.

Many prior art conduit systems were susceptible to infiltration of moisture into the insulation around the pipes as well as into contact with the pipes themselves as a result of thermal expansion and contraction of the pipe breaking seals at the ends of the conduit units. Conduit systems of the character referred to are sometimes buried in the ground which gives rise to the possibility of ground water infiltration into the juncture of conduit units with each other or with coupling units. When the conduit systems are installed above ground, moisture from the elements as well as moisture resulting from atmospheric water vapor can infiltrate the systems. Even in conduit systems employing coupling units constructed to minimize the effects of temperature responsive expansion and contraction of the conduit pipes, moisture infiltration tended to occur along sealing faces at the junctures of the conduit and coupling units.

In conduit systems employing ferrous pipes, infiltration of moisture at the joints between the couplings and the conduit units tended to cause serious corrosion problems. In addition to corrosion tending to cause the pipe itself to fail, pipe corrosion was apt to cause destruction of seals between the couplings and adjacent pipe ends due to abrasion of the coupling seals as corroded pipes changed length and shifted relative to the seals due to temperature variations.

SUMMARY OF THE INVENTION

The present invention provides a conduit system including a plurality of conduit units having internal pipes, adjacent ends of which are communicated via separate coupling units. The coupling units are constructed and arranged to seal about the pipes while enabling thermal expansion and contraction of the pipe and to minimize infiltration of moisture at the junctures of the conduit and coupling units.

In accordance with the invention, a conduit system is formed by a series of conduit units the ends of which are sealingly connected by interposed coupling units. The conduit and coupling units are assembled so that pipes of each conduit unit project from the conduit unit and are telescopically received in respective coupling units at opposite ends of the conduit unit.

Each conduit unit includes an outer jacket surrounding and spaced from the pipe and insulating material between the outer jacket and the pipe. Each coupling unit includes a coupling body for telescopically receiving the pipe ends of associated conduit units and a sleeve-like jacket surrounding and spaced from the coupling body. Sealing means disposed between the coupling unit and the conduit unit prevents infiltration of moisture into the juncture of the units. The sealing means is engaged in the end of one of the units and extends into the end of the other unit and includes a portion which bridges the adjacent ends of the conduit and coupling jackets to seal the juncture against infiltration of moisture. The seal means is disposed within recesses formed between the jackets and the respective coupling body and pipe.

In a preferred form of the invention the sealing means has an outer peripheral wall formed in part by axially spaced ribs, or ridges, extending circumferentially around the wall. A portion of each the wall is sealingly engaged with the inner periphery of the unit jacket and the remainder of the wall projects within and is sealingly engaged with the inner periphery of the jacket of the associated unit.

The sealing structure preferably includes sealing faces which are associated with the respective coupling and conduit units and are spaced axially from the jacket ends to provide a secondary seal against ground water infiltration to the pipe.

Thus in accordance with an important feature of the invention, moisture infiltration into the juncture of a conduit unit and a coupling unit is resisted by a sealing wall engaged with the conduit and coupling jackets proceeding axially away from the adjacent ends of the jackets along both the units, and by a secondary seal provided by sealing faces spaced axially from the jacket ends. The primary and secondary seals are sufficiently effective that ferrous pipe can be used in the conduit units without exhibiting unacceptable corrosion levels due to moisture infiltration at the juncture of the conduit and coupling units.

In one preferred embodiment of the invention, the conduit units are each formed by a central pipe having a mass of insulating material surrounding it, an imperforate sleeve-like jacket surrounding the insulating material, and an annular sealing member sealingly engaged with the pipe and the jacket at opposite ends of the conduit unit. The pipe projects from both ends of the conduit unit and the sealing elements project from the conduit jacket to locations short of the projecting ends of the pipe.

The associated coupling unit includes a tubular corrosion resistant coupling body which defines an internal passageway for receiving pipe end portions projecting from adjacent conduit units. The pipes are telescopically received in and sealingly engaged with the coupling body but are axially movable relative to the body to accommodate for thermal expansion and contraction of the pipes. The coupling body may be surrounded by a body of insulating material and a sleeve-like jacket is disposed about the insulating material to protect it from damage due to weathering, etc. Sealing members are disposed between the coupling jacket and the body in the vicinity of the opposite end portions of the coupling body.

The sealing members are preferably resilient annular parts which produce seals extending continuously about the coupling jacket and the coupling body. The sealing members are axially recessed from the adjacent ends of the coupling jacket and are disposed axially beyond or flush with the associated end of the coupling body.

When the coupling unit is assembled between adjacent conduit units the conduit sealing members of the respective conduit units project into the recess in the coupling unit and in so doing sealingly engage the inner periphery of the coupling jacket and an axially facing portion of the adjacent coupling unit sealing member. The conduit sealing members have a fluted outer peripheral wall defining a series of circumferential resiliently deformable sealing ribs, or ridges, which are resiliently deformed by the jackets to assure effective sealing between the outer periphery of each sealing member and the associated conduit and coupling jackets.

The ends of the conduit and coupling jackets are abutting or closely adjacent each other with the junctures of the jacket ends sealed by the conduit sealing members to prevent ground water infiltration of the coupling and conduit unit juncture between the jacket ends and axially along the inner periphery of either jacket. The engaged conduit and coupling seal members provide a secondary seal between the primary seal and the projecting pipe end to further minimize infiltration.

In another preferred embodiment of the invention the fluted sealing members form part of the coupling unit and project from each end of the coupling jacket. The coupling sealing members are supported by the coupling body with a portion of the fluted sealing member periphery resiliently and sealingly engaging the coupling jacket and the remainder of the fluted periphery resiliently and sealingly engaging the inner periphery of the conduit jacket. The primary seal thus formed extends axially in opposite directions from the adjacent jacket ends. The conduit sealing member and the coupling sealing member are in axially abutting sealing engagement at a location spaced axially from the adjacent ends of the coupling and conduit jackets to provide a secondary seal about the conduit pipe end.

Conduit systems constructed according to the present invention include conduit units and coupling units which are relatively uncomplicated and easily constructed, are easily assembled in the field, and which enable relatively unrestricted thermal expansion and contraction of the conduit pipes while sealing the junctures of the conduit and coupling units with a sufficiently high degree of effectiveness that ground water infiltration is minimized and usage of ferrous pipes in the conduit systems is possible.

Other important features and advantages of the invention will become apparent from the following detailed description of preferred embodiments and the accompanying drawings.

DETAILED DESCRIPTION OF PREFERRED EMBODIMENTS

Figure 1:
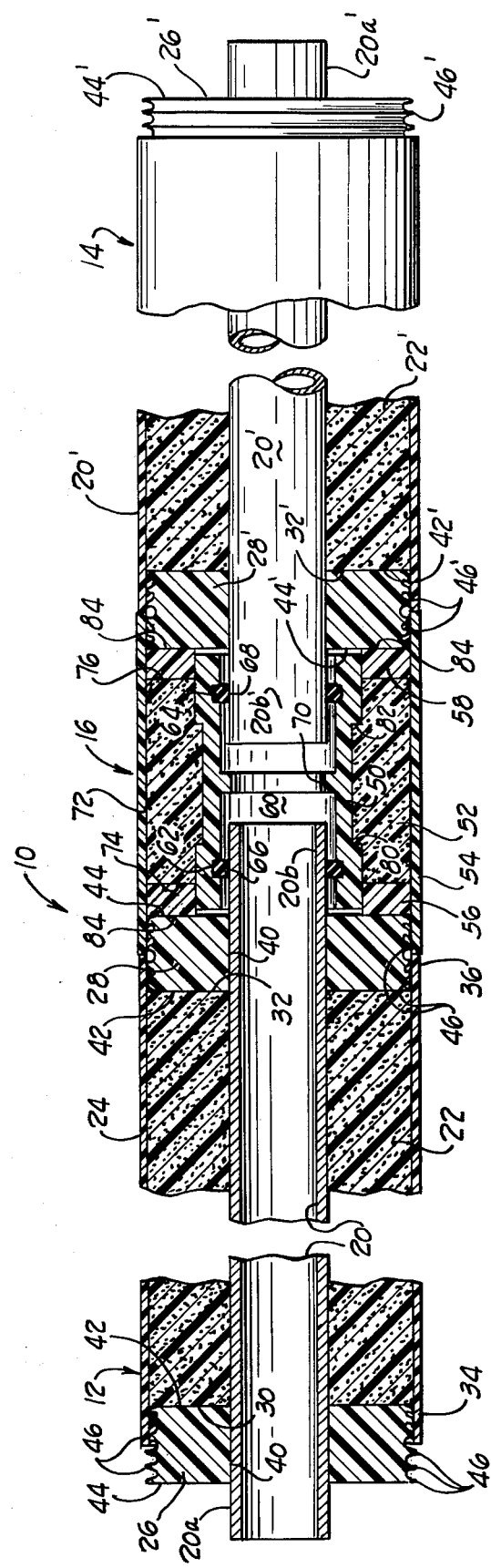
FIG. 1 is a longitudinal cross-sectional fragmentary view of a conduit system embodying the present invention; and, FIG. 2 is a longitudinal cross-sectional fragmentary view of a conduit system constructed according to another preferred embodiment of the invention.

A portion of a conduit system 10 is illustrated in FIG. 1 and comprises a conduit unit 12, a conduit unit 14 and a coupling unit 16 between adjacent ends of the conduit units 12, 14. The conduit and coupling units are generally fabricated in a factory and shipped to an installation site in the field where they are assembled together as illustrated in the drawing. Completed conduit systems are often buried in the ground but they may also be placed at or above ground level if desired.

The first conduit unit 12 comprises a length of pipe 20 (which is illustrated as constructed from a suitable ferrous material) having opposite end portions 20a, 20b projecting from the ends of the conduit unit, a tubular mass or body 22 of insulating material extending circumferentially about the pipe 20, a protective conduit jacket or casing 24 disposed about the mass 22 and annular resiliently deformable conduit sealing members 26, 28 disposed at opposite ends, respectively, of the conduit unit 12.

In the embodiment of the invention illustrated by FIG. 1 of the drawings the body 22 is formed of a polyurethane foam material which is foamed in place about the pipe. The body 22 is preferably cylindrical and defines axial end faces 30, 32 against which the respective sealing members 26, 28 are disposed. The pipe end portions 20a, 20b, project axially from the sealing members and the insulating body 22.

The conduit jacket 24 is disposed circumferentially about the body 22 throughout the axial length of the body to protect the body from damage during shipment as well as from weathering and water infiltration after installation of the conduit system. The jacket 24 is preferably formed by a relatively rigid imperforate plastic sleeve having end portions 34, 36 at opposite axial extremities of the conduit unit which project beyond the body 22 but terminate short of the axial end portions of the pipe 20 and the sealing members 26, 28. In the embodiment of the invention illustrated in FIG. 1 the sleeve is formed from a polyvinylchloride plastic, however, other suitable materials could be used.

The conduit sealing members 26, 28 are identical annular rubber-like plastic members which cooperate to seal the space occupied by the body 22 between the jacket end portions 34, 36. In the illustrated embodiment the members 26, 28 each define an inner periphery 40 sealingly engaging and supported by the pipe 20, a first annular face portion 42 confronting the body 22, a second annular face portion 44 located axially between the respective adjacent jacket and pipe end portions, and an outer peripheral face portion which is fluted to define a series of annular ribs, or ridges, 46. The ribs extend radially from the sealing member proper sufficiently that the sealing member diameter is slightly greater than the inner diameter of the jacket 24 before assembly of the sealing member in the conduit unit. When the sealing members are assembled on the pipe 20 part of the outer peripheral face portion is forced into the jacket resulting in resilient deflection of those ribs 46 which are disposed within the jacket. The ribs are thus forced into sealing engagement with the jacket to prevent fluid flow axially along the conduit unit from the ends of the jacket between the ribs and the jacket periphery. As shown at the extreme left of FIG. 1, part of the sealing member outer peripheral face portion extends from the conduit jacket and ribs formed on this face portion remain undeformed after assembly of the sealing members in the conduit unit.

The second conduit unit 14 is identical to the conduit unit 12 and the parts of the second conduit unit which are identical to parts previously described are indicated by corresponding primed reference characters. The conduit unit 14 is not further described in detail, as such, in the interest of brevity.

The coupling unit 16 is assembled between the conduit units 12, 14 and in the embodiment of the invention illustrated by FIG. 1 comprises a tubular generally cylindrical coupling body 50, a mass or body 52 of insulating material extending about the coupling body 50, a coupling jacket or casing 54 disposed circumferentially about the insulating body 52 and coupling sealing members 56, 58 disposed at opposite axial ends of the coupling unit between the coupling body 50 and the coupling jacket 54.

The coupling body is preferably formed from a corrosion resistant material such as plastic, copper, stainless steel, etc., and defines an interior passage 60 which is coaxial with and of larger diameter extent than the conduit unit pipe end portions. The wall of the passage 60 is provided with axially spaced circumferential grooves 62, 64 which receive respective resilient O-ring type seals 66, 68. The conduit unit pipe end portions 20b, 20b' extend into the passage 60 from its opposite ends are sealingly engaged by the respective seal rings 66, 68. Thermal expansion and contraction of the pipes 20, 20' resulting in relative axial movement of the pipes relative to the coupling body occurs without affecting the seal between the coupling body and either of the pipes because the pipes are slidable axially relative to the seal rings 66, 68.

In the illustrated embodiments of the invention, the coupling body 50 is provided with a pipe expansion stop which, as illustrated in FIG. 1, is formed by a radially inwardly projecting flange 70 located midway between the ends of the coupling body. It should be noted that the axial length of the coupling body 50 is greater than the combined lengths of the projecting pipe end portions 20b, 20b' so that a predetermined amount of foreseeable thermal expansion of the pipes 20, 20' is readily accommodated by the coupling unit.

The body 52 of insulating material disposed about the coupling body is preferably formed by foamed-in-place polyurethane material which defines a cylindrical exterior periphery 72 and axial end faces 74, 76. During manufacturing when the material of the body 52 has been foamed about the coupling body, the insulating material frictionally grips the coupling body to prevent relative rotation between the coupling body and the insulation material. The outer periphery of the coupling body is formed by a recessed portion defining radially extending shoulders 80, 82 which effectively lock the body 52 against axial movement relative to the coupling body 50.

The coupling jacket 54 is preferably formed by a relatively rigid sleeve of plastic material, such as polyvinylchloride, which extends circumferentially about and axially beyond the insulation body end faces 74, 76. The coupling unit 16 is preferably assembled with the jacket 54 in place during manufacturing so that field installation of the jacket to the remainder of the coupling unit parts is not required.

The coupling sealing members 56, 58 are preferably identical annular members formed of a resilient rubber-like plastic material which are supported on and sealingly engage the coupling body 50 at their inner peripheries and extend radially to sealingly engage the jacket 54 along their outer peripheries. The coupling sealing members block infiltration of moisture or ground water into the insulating body 52 along the inner periphery of the jacket 54 and the outer periphery of the coupling body 50. As illustrated in FIG. 1 the coupling sealing members 56, 58 abut the insulating body axial end faces 74, 76 respectively and define face portions 84 which face away from the coupling unit 16. The face portions are axially recessed from the adjacent ends of the coupling jacket 54 and project slightly from the adjacent axial ends of the coupling body 50.

When the conduit and coupling units are assembled, as illustrated in FIG. 1, the conduit sealing members 28, 28' are forced into the coupling jacket 54 so that the sealing member ribs 46 are resiliently deformed by and sealingly engage the inner periphery of the coupling jacket when the ends of the conduit and coupling jackets abut or are closely adjacent each other. The conduit sealing member thus forms a primary seal for preventing infiltration of moisture, such as ground water, to the conduit pipe ends via the adjacent ends of the conduit and coupling jackets. It should be noted that the primary seal referred to prevents infiltration of moisture along paths extending in opposite axial directions from the adjacent jacket ends and that the ribs 46 are resiliently deformed towards the jacket ends so that any pressure differentials tending to cause infiltration of the coupling and conduit junctures tends to increase the effectiveness of the seal.

The conduit sealing member face portions 44, 44' engage the adjacent coupling sealing member face 84 when the conduit and coupling units are assembled so that a secondary seal is defined by the abutting sealing members. The secondary seal location is spaced axially from the conduit and coupling jacket juncture so that the potential leakage path from the adjacent ends of the conduit and coupling jackets to the adjacent conduit pipe end is relatively long and tortuous as well as being mechanically blocked by the primary and secondary seals.

Figure 2:
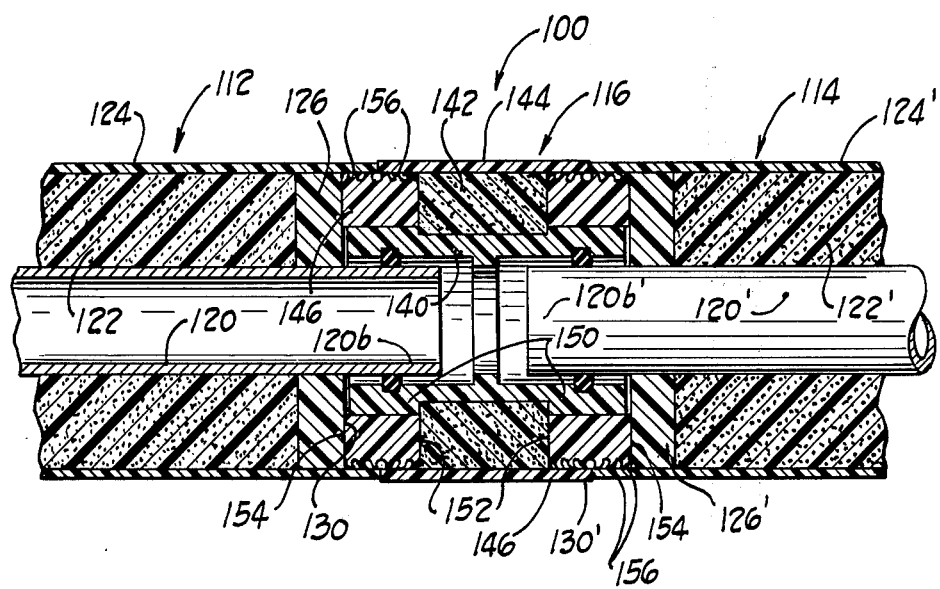

FIG. 2 illustrates an alternate construction of part of a conduit system 100 embodying the invention. The conduit system 100 includes units 112 and 114 (shown in part) and an interposed coupling unit 116 which connects and seals the conduit units 112, 114.

The conduit units are identical and only the unit 112 is briefly described with identical parts of the unit 114 bearing corresponding primed reference characters. The conduit unit 112 includes a pipe 120, formed of a suitable material including ferrous metals, having opposite ends (only one shown at 120b) projecting axially from the unit. The pipe is surrounded along part of its length by a body 122 insulating material which is preferably foamed in placed polyurethane plastic. A conduit jacket 124 extends circumferentially about the body 122 and projects axially beyond the body. Conduit sealing members 126 (only one of which is illustrated) are sealingly supported on the pipe end portions 120b and extend radially from the pipe into sealing engagement with the inner periphery of the conduit jacket 124 so that the volume occupied by the insulating body 122 is sealed off from the ends of the conduit unit.

The conduit sealing members 126 have a generally rectangular quarter sectional shape and define an axial face portion 130 which is recessed from the end of the projecting pipe end portion 120b and from the end of the surrounding conduit jacket 124.

The coupling unit 116 includes a coupling body 140 (which is identical to the coupling body 50 described above), a body 142 of insulating material which is preferably foamed in place about the coupling body, a coupling jacket 144 (constructed the same as the coupling jacket 54 described in reference to FIG. 1), and coupling sealing members 146 at opposite ends of the coupling unit.

The coupling sealing members are identical to each other and are constructed like the conduit sealing members 26, 28 described in reference to FIG. 1. The coupling sealing members 146 are annular rubber-like plastic members which cooperate to seal the space occupied by the insulation body 142. In the illustrated embodiment the members 146 each define an inner periphery 150 sealingly engaging and supporting by the coupling body 140, a first annular face portion 152 confronting the body 142, a second annular face portion 154 located axially beyond the respective adjacent coupling jacket end portion, and an outer peripheral face portion which is fluted to define a series of annular ribs, or ridges, 156. The ribs extend radially from the sealing member proper sufficiently that the sealing member diameter is slightly greater than the inner diameter of the jacket 144 before assembly of the sealing member is the coupling unit.

When the sealing members are assembled on the coupling body 140, part of the outer peripheral face portion is forced into the jacket 144 resulting in resilient deflection of those ribs 156 which are disposed within the jacket. The ribs are thus forced into sealing engagement with the jacket to prevent fluid flow axially along the coupling unit from the ends of the jacket between the ribs and the jacket periphery. As shown by FIG. 2, part of the sealing member outer peripheral face portion extends from the coupling jacket and ribs formed on this face portion remain undeformed after assembly of the sealing members in the coupling unit.

The conduit units 112, 114 are assembled to the coupling unit 116 in the same manner referred to in connection with FIG. 1 so that the pipe end portions 120b are telescopically received by the coupling body 140. During assembly the coupling sealing members 146 are urged into the conduit jackets 124, 124' so that part of the ribbed periphery of each coupling sealing member 146 is forced into the respective associated conduit jacket 124, 124' and the ribs 156 on that part of the sealing member are resiliently deformed by and sealingly engaged with the conduit jacket.

The face portion 154 of each coupling sealing member is preferably dispised axially slightly beyond the adjacent end of the coupling body 140 so that when the conduit system 100 is assembled the faces 130, 154 of each adjacent pair of conduit and coupling sealing members are in abutting sealing relationship. The coupling sealing members 146 thus provide primary seals for blocking infiltration of moisture into the juncture of each conduit and coupling unit between the adjacent ends of the conduit and coupling jackets. The abutting faces of each associated pair of coupling and conduit sealing members provides a secondary seal spaced axially from the adjacent ends of the coupling and conduit jackets so that a relatively long and tortuous potential path of infiltration is formed, as referred to in connection with FIG. 1, which is mechanically blocked by the primary and secondary seals.

While two embodiments of the invention have been illustrated and described in detail, the invention is not to be considered limited to the precise constructions disclosed. Various modifications, adaptations, and uses of the invention may occur to persons skilled in the art to which the invention pertains and the intention is to cover all such adaptations, modifications, and uses which come within the spirit or scope of the appended claims.

What is claimed is:

1. In a conduit system wherein a plurality of conduit units are laid end to end with adjacent ends of the conduit units coupled together and sealed:
   a. first conduit unit comprising:
      i. a length of pipe;
      ii. a tubularly configured mass of insulating material extending circumferentially about said pipe and axially therealong;
      iii. a sleeve-like conduit jacket extending circumferentially about said mass and axially therealong, said pipe defining end portions projecting a predetermined distance axially from said mass and said conduit jacket, said conduit jacket defining end portions extending axially beyond said mass; and,
      iv. annular resiliently deformable conduit sealing members each defining a first annular face confronting said mass, a second annular face disposed axially between a respective conduit jacket end portion and pipe end portion, an inner peripheral portion sealingly engaged with said pipe and an outer peripheral portion extending axially between said first and second faces and defining outwardly projecting circumferential ribs deformed by and sealingly engaged with the interior of said jacket axially between said mass and the respective jacket end portion and outwardly projecting circumferential ribs disposed axially between the respective jacket end portion and said second face;
   b. a second conduit unit comprising:
      i. a second length of pipe;
      ii. a second tubularly configured mass of insulating material extending circumferentially about said pipe and axially therealong;
      iii. a second sleeve-like conduit jacket extending circumferentially about said mass and axially therealong, said second pipe defining end portions projecting a predetermined distance axially from said mass and said second jacket, said second jacket defining end portions extending axially beyond said mass; and
      iv. second annular resiliently deformable conduit sealing members each defining a first annular face confronting said mass, a second annular face disposed axially between a respective second jacket end portion and second pipe end portion, an inner peripheral portion sealingly engaged with said second pipe, and an outer peripheral portion extending between said first and second faces and defining outwardly projecting first circumferential ribs deformed by and sealingly engaged with said second conduit jacket axially between said mass and the respective jacket end portion and outwardly projecting second circumferential ribs disposed axially between the respective second jacket end portion and said second face; and, c. a coupling unit disposed between said first and second conduits comprising:
  i. a tubular coupling body member having opposed end portions extending about adjacent projecting end portions of said first and second pipes;
  ii. pipe engaging seals disposed radially between said coupling body end portions and said pipe end portions;
  iii. a tubularly configured mass of insulating material extending about said coupling body and axially therealong throughout a portion of the axial length of said coupling body, said coupling body end portions extending axially from said insulating material;
  iv. first and second annular resiliently deformable coupling sealing members disposed at respective opposite end portions of said coupling body and extending about and sealingly engaged with the outer periphery of the respective end portions, each coupling sealing member defining a portion facing axially of said coupling body and engaging a respective second face of the adjacent annular sealing member of said first or second conduit unit; and,
  v. a sleeve-like coupling unit jacket extending about said coupling body member and said first and second annular coupling sealing members, said coupling jacket defining projecting end sections extending axially beyond said coupling sealing members, each coupling jacket end portion defining a substantially circumferentially continuous cylindrical peripheral inner surface;

d. opposed ends of said coupling unit jacket disposed in confronting relationship with the ends of said respective first and second conduit jackets and said peripheral cylindrical coupling jacket surfaces deforming and sealingly engaging said circumferential ribs of the adjacent conduit unit sealing member so that the first and second circumferential ribs are disposed on opposite axial sides of the confronting coupling and conduit unit jackets, said conduit sealing members extending into said respective coupling jacket end portions and the location of engagement of said coupling and conduit sealing members spaced axially from said confronting conduit and coupling jacket ends.

* * * * *